United States Patent
Sato

(10) Patent No.: US 7,455,714 B2
(45) Date of Patent: Nov. 25, 2008

(54) POWDER OF FINE ALLOY PARTICLES HAVING AN UNEVEN SURFACE AND METHOD OF MANUFACTURING THE POWDER

(75) Inventor: Kimitaka Sato, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 222 days.

(21) Appl. No.: 11/194,690

(22) Filed: Aug. 2, 2005

(65) Prior Publication Data

US 2006/0027042 A1 Feb. 9, 2006

(30) Foreign Application Priority Data

Aug. 4, 2004 (JP) .............................. 2004-227733

(51) Int. Cl.
*B22F 9/20* (2006.01)
*B01J 23/40* (2006.01)

(52) U.S. Cl. .......................................... 75/371; 75/374

(58) Field of Classification Search .................. 75/255, 75/371, 374; 502/185
See application file for complete search history.

(56) References Cited

U.S. PATENT DOCUMENTS

| | | | | |
|---|---|---|---|---|
| 5,876,867 | A * | 3/1999 | Itoh et al. | 429/44 |
| 6,254,662 | B1 * | 7/2001 | Murray et al. | 75/348 |
| 6,833,019 | B1 * | 12/2004 | Lewis et al. | 75/345 |
| 7,033,416 | B2 * | 4/2006 | Kurihara et al. | 75/351 |
| 2004/0025635 | A1 * | 2/2004 | Kurihara et al. | 75/345 |
| 2004/0074336 | A1 * | 4/2004 | Daimon et al. | 75/365 |
| 2004/0099092 | A1 * | 5/2004 | Harutyunyan et al. | 75/343 |
| 2005/0221976 | A1 * | 10/2005 | Chen et al. | 502/182 |

FOREIGN PATENT DOCUMENTS

JP 3258295 12/2001

OTHER PUBLICATIONS

S. Sun et al., "Monodisperse FePt Nanoparticles and Ferromagnetic FePt Nanocrystal Superlattices", Science, vol. 287, Mar. 17, 2000, pp. 1989-1992.
B. Jeyadevan et al., "Direct Synthesis of fct-FePt Nanoparticles by Chemical Route", Japan Journal of Applied Physics, vol. 42, Apr. 2003, pp. L350-L352.

* cited by examiner

*Primary Examiner*—Roy King
*Assistant Examiner*—Ngoclan T Mai
(74) *Attorney, Agent, or Firm*—Clark & Brody

(57) ABSTRACT

The invention provides a powder of fine particles of an alloy of platinum-family metal having a surface with a large amount of unevenness that is suitable as a catalyst metal. It is a powder of an alloy containing T and M in a composition ratio represented by the formula $[T_xM_{1-x}]$, where T is one or two or more of the elements Fe, Co and Ni, M is one or two or more of the elements Pt, Pd and Ru, X represents a numerical value in the range 0.1-0.9, and wherein: its average grain size as measured under TEM observation ($D_{TEM}$) is 50 nm or less, and under TEM observation, a plurality of protruding points is observed on the surface of the particles and indentations are observed between the protruding points, making it a fine powder of alloy particles with an uneven surface. This powder of fine alloy particles has a crystal structure with a face-centered cubic (fcc) structure, and its single crystallinity $(D_{TEM})/(D_X)$ is 1.50 or greater. In addition, the average grain size of the alloy particles as found by the dynamic light-scattering method is 50 nm or less.

3 Claims, 2 Drawing Sheets

POWDER OF FINE ALLOY PARTICLES HAVING AN UNEVEN SURFACE AND METHOD OF MANUFACTURING THE POWDER

BACKGROUND OF THE INVENTION

1. Field of the Invention

The present invention relates to a powder of alloy particles that is particularly useful as a catalytic material and a method of manufacturing the powder. The powder of alloy particles according to the present invention is suitable for use as a catalytic material in electrode catalysts for fuel cells and catalysts for use in automotive emissions control, or as a biomolecule marker or drug delivery system (DDS) or other material used in medical treatment.

2. Background Art

Electrode catalysts for fuel cells and catalysts for use in automotive emissions control are actually provided in the form for practical use as catalytic equipment consisting of many different raw materials, but among the elements constituting this equipment, the properties of metal catalysts typified by Pt and Pd dominate the catalytic activity thereof. However, drops in this catalytic activity occasionally occur.

In electrode catalysts for fuel cells for example, electrical power is generated by the oxidation of hydrogen on the anode side and the reduction of oxygen on the cathode side, but since platinum is used as the electrode catalyst in most cases, these platinum catalysts suffer from poisoning due to strong CO adhesion. The main cause of this is that the hydrogen gas used on the anode side is often not expensive pure hydrogen gas, but rather hydrogen-enriched gas produced by reforming hydrocarbon fuels that may contain roughly 1% CO. Similar poisoning of platinum catalysts by CO adhesion also occurs in automotive emissions control catalysts, thus inducing a decrease in catalytic activity.

Studies of using platinum alloy catalysts as countermeasures against this problem of catalyst poisoning due to CO adhesion have been made. The use of alloys is intended to lower the CO oxidation potential. This is beneficial not only because the alloying is done with iron and nickel and other elements that are less expensive than the platinum-family metals but are also less susceptible to poisoning by CO adhesion, and also it is possible to use finer particles and improve the catalytic activity. Representative candidates include Pt—Fe-based and Pt—Ni-based nanoparticle powders.

However, the manufacture of such powders of fine alloy particles with greatly divergent standard electrode potentials is not necessarily easy. The standard electrode potentials of Pt and Pd are 1.50 V and 0.99 V, respectively, but the standard electrode potentials of Fe and Ni are −0.44 V and −0.25 V. If one tries to reduce metal ions of such greatly divergent standard electrode potentials, e.g. Pt ions and Fe ions, by the wet method using a reducing agent to precipitate an FePt alloy, the readily reduced Pt ions will be reduced first and as a result, either the Pt particles and Fe particles will precipitate separately or a core-shell structure in which the Fe precipitates around the Pt first precipitated may result, so it is difficult to produce alloy particles that are uniform on the atomic level.

Nanoparticles of FePt have recently attracted attention in the field of magnetic materials, and methods of producing them have been proposed in JP 3258295B (JP 2000-54012A; Patent Document 1) and in *Science*, Vol. 287, 17 Mar. 2000, pp. 1989-1992 (Non-Patent Document 1). These are methods of producing FePt alloy particles by performing the pyrolytic decomposition of iron pentacarbonyl simultaneously with the reduction of platinum(II) acetylacetonate by a polyhydric alcohol. The FePt particles obtained by these methods have a fcc (face-centered cubic) structure and a grain size of roughly, 2-5 nm, giving particles that are nearly spherical in shape.

Another method is that disclosed in the *Japanese Journal of Applied Physics*, Vol. 42, No. 4A, 1 Apr. 2003, pp. L350-352 (Non-Patent Document 2). Non-Patent Document 2 recites a method whereby tetraethylene glycol (TEG) is used as the polyol at the time of preparation of FePt nanoparticles by the polyol method, so when platinum and iron acetylacetonate are reduced at 300° C., FePt nanoparticles with the fct (face-centered tetragonal) structure are obtained as produced. The FePt particles are spherical and aggregated.

SUMMARY OF THE INVENTION

The FePt particles obtained by the methods of Patent Document 1 and Non-Patent Document 1 are nearly spherical in shape. The particles obtained by the method of Non-Patent Document 2 also have spherical primary particles but these primary particles become aggregated. Such spherical particles are not necessarily suitable for use in catalytic applications. The sphere is the shape that has the minimum surface area for the same volume, so the surface area per volume becomes small and the surface area for the catalytic reaction also becomes small, and thus in the case of a sphere, even if the catalyst is supported upon a carrier (e.g., carbon black), the bonding strength between the catalyst particles and the carrier is weakened. If the supporting force is weak, then in high-temperature (e.g. 500° C. or higher) service environments, sintering between catalyst particles and other phenomena occur, resulting in the particles becoming larger and their catalytic activity decreasing. Moreover, if the particle powder becomes aggregated, the individual particles may not be able to exhibit adequate catalytic function.

Accordingly, the present invention has as its object to solve such problems, so that when platinum-family metals typified by Pt are alloyed with Fe, Co, Ni and other metals, fine alloy particles suited for use as catalytic materials are obtained.

Thus, the present invention provides a powder of fine alloy particles having an uneven surface which is a powder of an alloy containing T and M in a composition ratio represented by the formula $[T_xM_{1-x}]$, where T is one or two or more of the elements Fe, Co and Ni, M is one or two or more of the elements Pt, Pd and Ru, X represents a numerical value in the range 0.1-0.9, which powder is characterized in that:

its average grain size as measured under TEM observation $(D_{TEM})$ is 50 nm or less, and under TEM observation, a plurality of protruding points is observed on the surface of the particles and indentations are observed between the protruding points.

This powder of fine alloy particles has a crystal structure that is a face-centered cubic (fcc) structure, the x-ray crystallite size $(D_X)$ is 10 nm or less and single crystallinity=$(D_{TEM})/(D_X)$ is 1.50 or greater, so it is suitable as an alloy for use as a catalyst. This powder of alloy particles can be produced by a method comprising the steps of: dissolving metal salts containing the T component and the M component in a solution of a polyhydric alcohol and/or a derivative thereof with a boiling point of 100° C. or greater such that no solids remain, and placing that solution in an inert gas atmosphere at a temperature of 100° C. or greater and 250° C. or less, preferably in the presence of a nucleating agent, to reduce the metal salts with the polyhydric alcohol and/or derivative thereof, thereby synthesizing a powder of alloy particles.

DESCRIPTION OF THE PREFERRED EMBODIMENT

Figure 1:
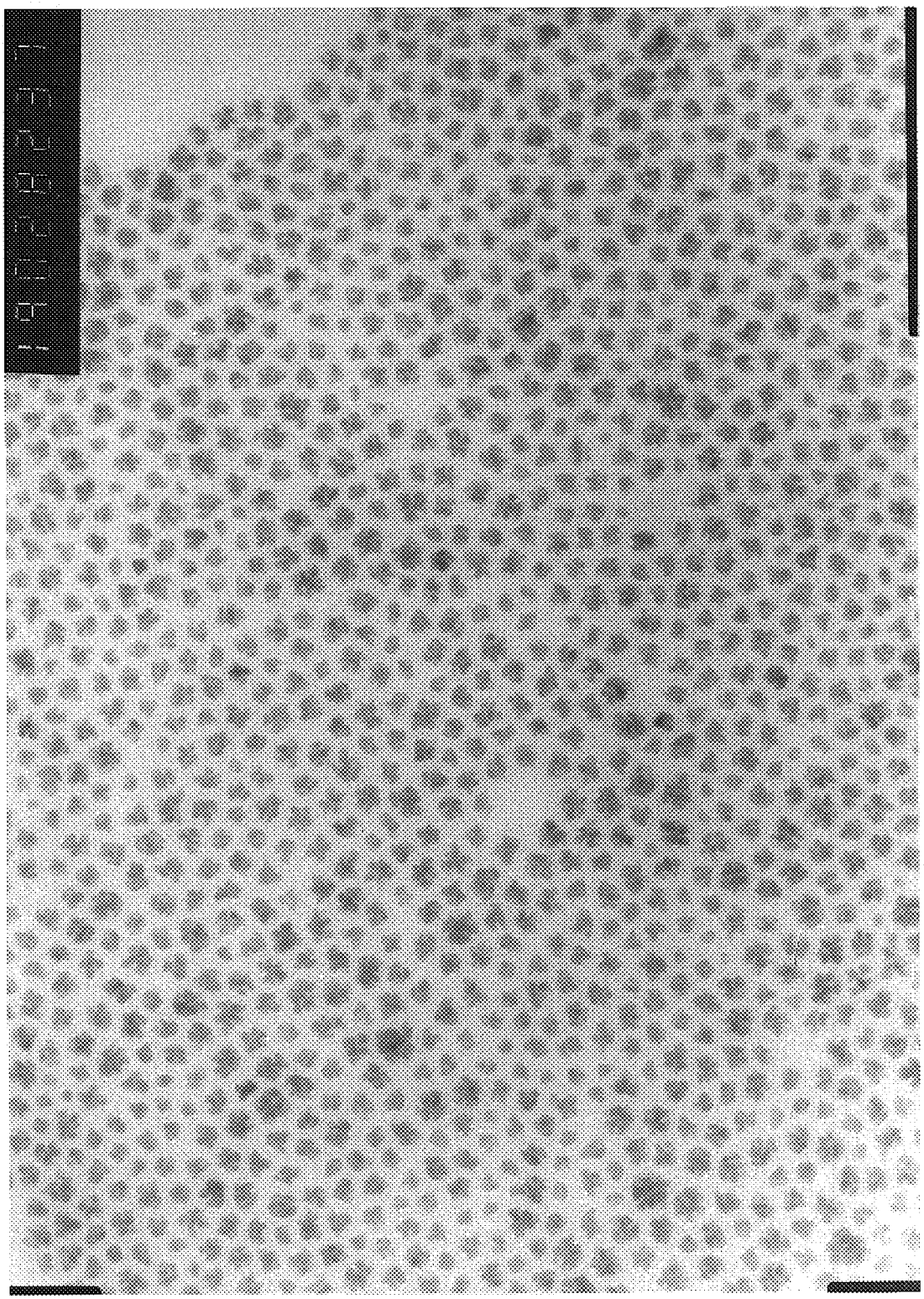
FIG. 1 is a TEM image illustrating an example of the shape of an alloy particle powder with a fcc structure according to the present invention.

A preferred embodiment of the invention will now be made with focus on the individual features that characterize the invention.

Chemical Composition of the Alloy

The alloy powder according to the present invention is an alloy containing at least Fe, Co and/or Ni and also Pt, Pd and/or Ru, having a metal texture consisting primarily of face-centered cubic (fcc) crystals.

The alloy composition is such that it is an alloy containing T and M in a composition ratio represented by the formula $[T_xM_{1-x}]$, where T is one or two or more of the elements Fe, Co and Ni, M is one or two or more of the elements Pt, Pd and Ru, and X is a numerical value in the range 0.1-0.9, wherein metallic elements other than T and M comprise no more than 30 at. % (including 0%) of (T+M) as an atomic percentage, while the remainder consists of impurities that are unavoidable in manufacture.

Regarding the value of X in the formula $[T_xM_{1-x}]$, if this is less than 0.1 then there is too little of the platinum-family metal component in the catalyst metal and its usefulness as an alloy for use as a catalyst is decreased. On the other hand, if the value of X exceeds 0.9, then the purposes of alloying the platinum-family metals as a catalyst metal, e.g., reducing catalyst poisoning and reducing cost, cannot be adequately achieved, so the value of X should be in the range 0.1-0.9, preferably 0.2-0.8, or more preferably 0.3-0.7. In addition, when the value of X is in this range, then alloy particles with an uneven surface can be stably manufactured.

The metallic elements other than T and M may include e.g. metallic elements constituting the nucleating agent and metallic elements that affect phase changes in the crystal structure. The alloy may contain such metallic elements other than T and M in a total amount no more than 30 at. % of (T+M) as an atomic percentage. However, it may contain an amount no more than 20 at. % or an amount no more than 10 at. % or in certain cases it may contain none at all.

If the metal texture varies among individual particles, then the unevenness of the surface may also vary readily, so it may be difficult to obtain the desired surface state. In such a case, a component (called the Z component) that stabilizes the metal texture may also be added. Specifically, if a salt of this Z is added at the time of synthesis of the alloy according to the present invention, then it is preferable for it to be a metal Z that precipitates along the crystal grain boundaries or grain boundaries at the time of reduction to metal, thus exhibiting the action described above. Examples of metallic elements that have this action include Ag, Cu, Sb, Bi, Pb and others. It is important for the Z component to be one whose salt is reduced by polyol. The Z component content is preferably less than 30 at. % of the total amount of T and M. If the atomic percentage of Z/(T+M) is greater than 30 at. %, then there would be too much of the Z component so it would prevent a constant metal texture from being obtained. The Z component is not mandatory, so the alloy need not contain the Z component if a constant metal texture can be obtained even without the Z component being added.

In addition, if an appropriate nucleating agent is used when producing the alloy according to the present invention, then dispersion in composition among the individual particles becomes smaller and alloy particles with a constant metal texture can be stably produced. As a result, dispersion between individual particles in the unevenness of the surface is reduced, and a powder of alloy particles comprising particles of uniform composition, texture and symmetrical shape can be obtained. A salt of an appropriate metal (the N component) is preferably used as such a nucleating agent. The N component content should be less than 20at. % of the total amount of T and M.

Here, the N component may also be the same as the T component or the M component (e.g., Pt, Pd, Ru, etc.), and in this case, a metal salt of a different type than the metal salt used as the alloy raw material to be reduced. The amount used should be such that the amount of T or M in the nucleating agent is no less than 0.01 at. % and no more than 20 at. % of T+M in the alloy raw material. In addition, the N component may be a metal component different than T or M, e.g. a salt of Au, Ag, Rh, Os, Ir or other metals. The amount used in this case should be such that the atomic percentage of the metal component in the nucleating agent is no less than 0.01 at. % and no more than 20 at. % of T+M. The nucleating agent is preferably at least one metal salt of Au, Ag, Ru, Rh, Pd, Os, Ir or Pt.

Even though the individual particles are fine particles smaller than 50 nm, the powder of alloy particles according to the present invention consists of particles with an alloy composition and texture that is symmetrical over each particle, and for this reason, it is characterized by having shapes where the surface states of each particle are nearly identical. In particular, the individual particles of the alloy according to the present invention have a fcc structure, and because of this, the individual particles have a characteristic shape with a plurality of protruding points on their surface and indentations between the protruding points.

Metal Texture and Particle Shape of the Alloy

Figure 2:
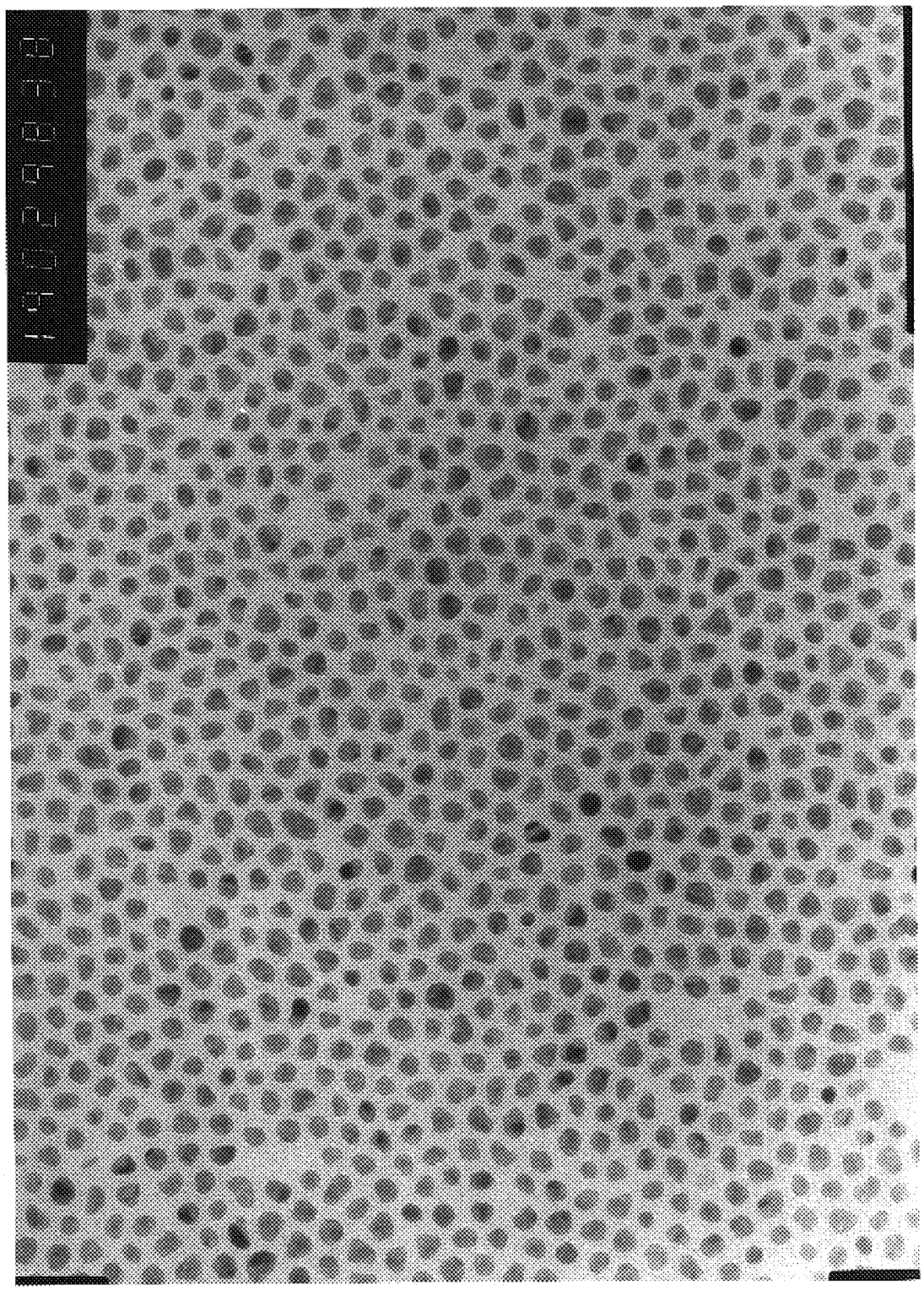
FIG. 2 is a TEM image illustrating an example of the shape of an alloy particle powder that has the same composition as that of FIG. 1 but with a fct structure.

FIG. 1 is a TEM image illustrating the shapes of alloy particles with the fcc structure according to the present invention obtained by means of an example to be described later. FIG. 2 is a TEM image illustrating the shapes of alloy particles that have the same composition as those of FIG. 1 but with the texture of a fct structure.

As seen in FIG. 1, at a glance, the alloy particles according to the present invention appear to have a pointy spherical shape like that of the Japanese sugar candy konpeitō (FIG. 1), with the individual particles further appearing to have extremely small nuclei that are partially connected. Each particle has a plurality of protruding points on its surface with indentations between the protruding points. Accordingly, they differ from solids such as cubes or rectangular parallelepipeds that may have a plurality of vertices but have a plurality of flat faces so there are no indentations between the vertices (protruding points). In contrast, alloy particles with the same composition but the fct structure (those shown in FIG. 2) have roughly the same grain size but are nearly spherical in shape, with few having protruding points on their surface and virtually none of those that have protruding points seen to have indentations between the protruding points.

In this manner, alloy particles according to the present invention with the fcc structure and consisting of the T component and the M component can be made to have a shape with drastic surface unevenness as shown in FIG. 1, and for this reason they can be provided with a surface shape that is suitable as a catalyst material.

Grain Size

The powder of alloy particles according to the present invention has primary particles observed by transmission electron microscopy (TEM) to have an average grain size of 50 nm or less, preferably 30 nm or less and more preferably 20 nm or less. A "primary particle" is defined as the smallest discrete identifiable entity.

The powder of alloy particles having the fcc structure synthesized according to the present invention often form groups of many primary particles (called secondary particles) at the stage of being collected as a powder. The grain sizes of these secondary particles may be various depending on the conditions of the synthesis reaction, but they may become roughly 100 μm in size. However, even if such secondary particles are formed, they still constitute a powder that has fluidity overall.

The present inventor found that, upon performing a dispersion process using an ultrasonic homogenizer or the like in the presence of a dispersant of an appropriate surfactant or the like, the state in which the secondary particles are present immediately after synthesized can be modified to a state in which the primary particles are dispersed from each other at a stipulated spacing. FIG. 1 and FIG. 2 are photographs illustrating the state in which the primary particles are dispersed from each other at a stipulated spacing in two dimensions (in a single plane). Accordingly, when observing the average grain size and particle shapes of the primary particles, measurement can be performed by TEM observation after performing the dispersion process by this method.

When the powder of alloy particles according to the present invention is used as catalyst metal, the smaller the grain size of the particles, the greater the specific surface area becomes, and the catalytic activity also increases. The powder of alloy particles according to the present invention has primary particles observed by transmission electron microscopy (TEM) to have an average grain size of 50 nm or less, preferably 30 nm or less and more preferably 20 nm or less, so it is suitable as a catalyst from this standpoint also. In addition, the unevenness of its surface is drastic so this increases its surface activity and thus it has even better catalytic activity.

Average Grain Size Found by the Dynamic Light-Scattering Method

When an appropriate dispersion process is performed on the powder of alloy particles according to the present invention, it was found to be able to attain a stable dispersed state in a dispersant. The dispersed state of alloy particles in a dispersant can be evaluated by means of the dynamic light-scattering method, and the average grain size can also be calculated. The principle of this is described below. Particles with a grain size in the range of approximately 1 nm to 5 μm undergo translation and rotation and other Brownian motion in liquid, so their positions and orientations vary every minute. Accordingly, when a laser beam is shined onto these particles and the scattered light thus produced is detected, fluctuations in the scattered light intensity that depend on Brownian motion are observed. By observing temporal fluctuations in this scattered light intensity, the speed of the Brownian motion of the particles (the scattering coefficient) is obtained and furthermore the size of the particles can be known.

If the average grain size of the powder of alloy particles according to the present invention is measured based on this principle, and this measured value is close to the average grain size obtained by TEM observation, then this means that the particles are singly dispersed in the liquid (namely, the particles are not joined to each other or aggregated). That is to say, the individual particles are dispersed in the dispersant with space between them, so they can act alone and independently. With the present invention, the average grain size found by the dynamic light-scattering method performed on powder of alloy particles in a dispersant was found to exhibit an average grain size on a level that was not much different from the average grain size found by TEM observation. Specifically, it was confirmed that the powder of alloy particles according to the present invention achieved a singly dispersed state in a dispersant. The average grain size found by the dynamic light-dispersion method in dispersant is 50 nm or less, preferably 30 nm or less and more preferably 20 nm or less, and not greatly different from that obtained by TEM observation.

Note that even if the particles are perfectly dispersed singly in the dispersant, differences from the average grain size found by TEM observation may still arise due to measurement error and the like. For example, the density of the solution at the time of measurement must be suited to the performance and light-scattering detection scheme of the measurement apparatus, and errors arise unless the measurement is performed at a density at which a sufficiently large amount of transmitted light is obtained. In addition, the signal intensity obtained in the case of measurement of nanometer-order particles is very faint, so the effects of dirt and dust are large and can become the cause of error, so one must pay close attention to preprocessing of samples and the cleanliness of the measuring environment. The laser light source used to obtain sufficient dispersed-light intensity for the measurement of nanometer-order particles should have a power of 100 mW or greater.

X-Ray Crystallite Size ($D_X$)

The powder of alloy particles according to the present invention preferably has a crystalline particle diameter of 10 nm or less. The crystalline particle diameter of the powder of alloy particles according to the present invention can be found by Scherrer's equation from the results of x-ray diffraction. Thus, the crystalline particle diameter is called the x-ray crystallite size ($D_X$) in this specification. This is found as follows.

Scherrer's equation can be represented by the following general equation:

$$D = K \cdot \lambda / \beta \cos \theta$$

where K is Scherrer's constant, D is the crystalline particle size, λ is the measurement x-ray wavelength, β is the half width of the peak obtained by x-ray diffraction, and θ is the Bragg angle of the diffracted beam. If the value 0.94 is used for the value of K and Cu is used for the x-ray tube, the equation above becomes:

$$D = 0.94 \times 1.5405 / \beta \cos \theta$$

When deciding on the peak for alloy particles at which the D found by this equation is to be used, for FePt alloy particles for example, that for (111) observed near 41° can be adopted. For alloy particles of other compositions, it is sufficient to adopt large peaks that are sufficiently distinguishable from adjacent peaks.

Single Crystallinity

The powder of alloy particles according to the present invention should preferably have a ($D_{TEM}$)/($D_X$) ratio (called the single crystallinity) of 1.50 or greater. The single crystallinity is roughly equivalent to the number of single crystals with the fcc structure present in one particle. The greater the single crystallinity, the more drastic its surface unevenness tends to become. The powder of alloy particles of the present invention would ideally have an average of 1.50 or more single crystals with the fcc structure present in one particle, and this is thought to be why a plurality of protruding points occurs on the surface and indentations occur between the protruding points. Accordingly, the powder of alloy particles of the present invention that have a single crystallinity of 1.50 or greater have superior surface activity and as a result, they have superior catalytic activity and also have superior bonding strength to the carbon black or other carrier material.

Dispersion in the Composition of Individual Particles

Analysis of the composition of each of the individual particles in the powder of alloy particles according to the present invention can be performed by means of TEM-EDX. The method of transmission electron microscopy (TEM) and energy dispersive x-ray spectroscopy (EDX) using a nano-probe electron beam can be used to narrow down the measurement range to 1-2 nm, so as long as the powder of alloy particles subject to measurement has the particles sufficiently dispersed at positions far enough away from each other, it is possible to analyze the composition of each individual particle. With the present invention, a powder of alloy particles wherein the composition of each of the individual particles is not much different from the average composition as a powder is obtained. For example, when 100 particles of this powder arbitrarily selected from among 1000 particles within the field of view have their composition measured using TEM-EDX analysis, 90 or more of the particles, or preferably 95 or more of the particles have a composition within ±10% of the average composition, and the standard deviation of the compositions of those 100 particles are kept within 20%. The fact that there is no dispersion in composition between the individual particles means that there is also no dispersion in the crystal structure, and accordingly the individual particles have a stable fcc structure, so their shape should stably have the characteristic surface shape (konpeitō shape) illustrated in FIG. 1.

Method of Production

In order to produce the powder of alloy particles according to the present invention, it is sufficient to dissolve metal salts containing the T component and the M component from the formula above, in a proportion such that X becomes the desired composition ratio, in a solution of a polyhydric alcohol with a boiling point of 100° C. or greater and/or a derivative thereof such that no solids remain, place that solution in an inert gas atmosphere at a temperature of 100° C. or greater and 250° C. or less and thereby reduce the metal salts with the polyhydric alcohol and/or derivative thereof, and thus with this reduction, synthesize the powder of alloy particles. When the Z component and/or N component described previously is to be added, it is sufficient to add the metal salts thereof to the solution in which the T component and the M component are dissolved and then reduce them. If the reaction temperature exceeds 250° C., then the fct structure readily occurs, so particles with large surface irregularities are not readily produced.

The polyhydric alcohol is preferably triethylene glycol or tetraethylene glycol. However, this is not a limitation, as any polyhydric alcohol with a boiling point of 100° C. or greater or derivative thereof may be used in the present invention. In addition the polyhydric alcohol or derivative thereof may be of a single type or a mixture of two or more types. The T component and M component to be dissolved in this polyhydric alcohol should typically be supplied in the form of acetylacetonates thereof.

The heat up rate until the alloy synthesis temperature is reached should be controlled appropriately within the range of 0.5-15° C./minute. If the heatup rate is slower than 0.5° C./minute, then this is not preferable from the standpoint of productivity. The heatup rate as referred to in the present invention is, strictly speaking, the average rate of the increase in temperature (° C./minute) from 50° C. until 150° C. Actually, at the point at which the final target reaction temperature is neared, for example, when a temperature roughly 20° C. less than the final target temperature is reached, it is preferable for the heatup rate to be lowered and the temperature be raised gradually to the target temperature so that the actual temperature does not overshoot the target reaction temperature.

In the FePt particle synthesis reaction, it is important to control the reaction rate appropriately. Methods of doing so include the method of adjusting the metal concentration in the solvent. To wit, by suppressing the concentration of the metal materials, supersaturation of the metals thus produced can be lowered and the rates of nucleation and particle growth can be reduced. If the molar ratio of polyol to all of the metal ions contained in the metal salts, or namely the polyol/all metal ion molar ratio is made 100 or greater, then the FePt particles according to the present invention may be produced advantageously.

If the dispersion in the composition ration of T and M in each of the particles to be synthesized at the time of synthesis of alloy particles of T and M according to the present invention, then the crystal structure may change and particles that do not have the konpeitō-like surface shape may occur. In order to prevent this, the alloy particles should be synthesized in the presence of an appropriate nucleating agent. The nucleating agent used is a salt of the metal component N as described above, but the N component may or may not also be the same as the T component or the M component. If it is the same, then a different salt thereof is used. To wit, a metal salt (albeit a salt that is soluble in polyhydric alcohol) of a different type than the metal salt of the T component or M component of the alloy materials subjected to reduction is used as the nucleating agent. If it is not the same, then examples of the N component include Au, Ag, Rh, Os, Ir and the like, and polyhydric alcohol-soluble salts thereof are used. The amount of the nucleating agent used should be such that the atomic percentage N/(T+M) should be 0.01-20 at. % when N is different from T or M. In the case that N is the same as T or M, then the amount used would be such that X in the formula $[T_XM_{1-X}]$ is no less than 0.3 and no more than 0.7, but the T or M in the nucleating agent should be no less than 0.01 and no more than 20 at. % of the T+M in the alloy material. If the amount of nucleating agent used is less than 0.01 at. % then the effect of reducing dispersion in the composition of the individual particles and improving the reproducibility of the reaction is not seen. If it is added in excess of 20 at. %, then the undesirable deleterious effects of interfering with crystal growth may appear significantly.

In this synthesis reaction, a dispersant may be included in the reaction solution or a dispersant may be added to the slurry after the reaction, thereby able to suppress the cohesion between the particles synthesized with its adsorption on the particle surfaces. In addition, by using an appropriate type and amount of dispersant added, it is possible to control the grain size of the FePt particles synthesized. Examples of dispersants that can be used include surfactants containing amine groups, amide groups or azo groups, or organic compounds that contain either the thiol group or the carboxyl group within its structure that have the nitrogen atom and that are readily adsorbed to the surface of the FePt particle powder. Surfactants that have these functional groups may be coordinated directly to the metal surface of the FePt particle or the like, so they are suitable as surfactants used in the FePt particles according to the present invention.

Production of Catalysts

According to the present invention in this manner, fine particles of an alloy of a T component and an M component that have greatly differing standard electrode potentials can be produced, and moreover the particles with little dispersion among the composition of individual particles and a special shape consisting of connected single crystals with the fcc structure (a surface shape having a plurality of protruding points and indentations between the protruding points) are obtained. This powder of alloy particles consists of platinum-family metals alloyed to Fe, Ni, Co and the like, and they are fine particles with drastic surface irregularity so they are particularly suited as catalyst metals.

In order for this powder of alloy particles to be used as a catalyst, the powder must be supported upon an appropriate carrier, and in this case, it is difficult for the particles to be supported in a dispersed state on the carrier if they become aggregated. With the present invention, by using an appropriate surfactant as described above, the individual particles can be put into a dispersed state with space between them (the state of FIG. 1 or FIG. 2), but the in particular, the individual particles can be put in a state in which mutual reaction forces suppress bonding between particles, and the entire powder can be in a state exhibiting fluidity, so this is advantageous to the manufacture of catalyst.

Specifically, when the powder of alloy particles according to the present invention is supported upon carbon black, carbon tubes or other carbon-based carrier or the like, for example, they exhibit fluidity in the state in which bonding between particles is suppressed, and thus they can be applied to the carrier surface in a dispersed state.

The fluid state of the powder of alloy particles can also be exhibited in the dispersant. For example, if the alloy particles according to the present invention are dispersed in a dispersant such that there is space of 1 nm or greater between them, then a suspension wherein the density of these alloy particles in the dispersant is no less than $1.0 \times 10^{-5}$ vol. % and no more than 40 vol. %, and the average grain size of these alloy particles as found by the dynamic light-scattering method is 50 nm or less can be obtained. When the carrier is coated with such a suspension, or the suspension is put into mechanical or chemical contact with the carrier surface, thus attaching the alloy particles to the carrier, thereafter it is sufficient to perform the process of removing the dispersant and surfactant and such by appropriate processes if necessary, and so catalytic materials can be easily produced by this method. Thereby, it is possible to obtain novel catalysts comprising fine particles of surface-active platinum-family alloys dispersed upon a carrier. In addition, the powder of alloy particles according to the present invention is also suitable as a biomolecule marker or DDS or other material used in medical treatment.

EXAMPLES

Example 1

To 200 mL of tetraethylene glycol (boiling point: 327° C.) were added 1.30 mmol of iron(III) acetylacetonate and 1.30 mmol of platinum(II) acetylacetonate and then the iron(III) acetylacetonate and platinum(II) acetylacetonate were dissolved until no solids were still present. This solution was transferred to a vessel with a reflux condenser and placed in an oil bath and while nitrogen as an inert gas was blown into the vessel at a flow rate of 400 mL/min, the solution was stirred at a speed of 160 rpm and heated, so that reflux was performed for one hour at a temperature of 200° C., thus terminating the reaction. At that time, the heatup rate was 1° C./min.

Methanol was added in an amount three times that of the solution after the end of the reaction and it was placed in a centrifuge and then the supernatant solution was removed. 100 mL of methanol was again added to the residue (particle powder) remaining after the supernatant solution was removed, the mixture was placed in an ultrasonic cleaning tank and the process of cleaning by centrifugal separator was repeated an additional two times. Finally, a product containing the powder of alloy particles obtained by separating the supernatant solution was subjected to x-ray diffraction (XRD) and transmission electron microscopic (TEM) observation. At the time of TEM observation, the product containing the powder particles in question is placed in hexane, oleic acid and oleylamine are added as surfactants and then it is subjected to measurement in the state of the separated liquid obtained by ultrasonic separation.

As a result of x-ray diffraction, diffraction peaks corresponding to the superlattice reflections (001) and (110) originating from the fct structure were not observed and only peaks caused by the fcc structure were observed. The x-ray crystallite size ($D_X$) was 2.2 nm. In addition, the TEM image upon being subjected to TEM observation is illustrated in FIG. 1. As seen in FIG. 1, the individual particles consisted of primary particles that were distributed with a stipulated amount of space apart from each other, and each particle had a shape with large surface unevenness having a plurality of protruding points and indentations between the protruding points. The average grain size as measured under TEM observation ($D_{TEM}$) was 6.0 nm. Accordingly, the single crystallinity was 2.72. When the average grain size was measured by the dynamic light-scattering method with respect to the dispersant fluid, the average grain size was found to be 13.5 nm according to the dynamic light-scattering method.

In TEM-EDX measurement of the powder of alloy particles thus obtained, the average composition measured with respect to 1000 or more particles present within the field of view of measurement was found to be Fe:Pt=51:49 as an atomic ratio. In addition, of 100 individual particles selected arbitrarily from therein, 96 had compositions that fell within ±10% of the average composition given above, and the standard deviation of the composition of 100 particles was 12%.

Comparative Example 1

The procedure of Example 1 was repeated except for conditions of a reaction temperature of 300° C., a holding time at that temperature (reflux time) of 5 hours, and a heatup rate of 15° C./min, and the same measurements as in Example 1 were repeated on substance containing the powder of alloy particles thus obtained.

As a result, in x-ray diffraction, diffraction peaks corresponding to the superlattice reflections (001) and (110) originating from the fct structure were clearly observed, so it was confirmed to have the fct structure. The x-ray crystallite size ($D_X$) was 7.3 nm. In addition, the TEM image upon being subjected to TEM observation is illustrated in FIG. 2. As seen in FIG. 2, the individual particles consisted of primary particles that were distributed with a stipulated amount of space apart from each other, and each particle had a roughly spherical shape having a smooth surface. The average grain size measured from this TEM image ($D_{TEM}$) was 6.1 nm. Accordingly, the single crystallinity was 0.84. Also, the average grain size was found to be 17.7 nm according to the dynamic light-scattering method.

In TEM-EDX measurement of the powder of alloy particles thus obtained, the average composition measured with respect to 1000 or more particles present within the field of view of measurement was found to be Fe:Pt=51:49 as an atomic ratio. In addition, of 100 individual particles selected arbitrarily from therein, 96 had compositions that fell within ±10% of the average composition given above, and the standard deviation of the composition of 100 particles was 13%.

What is claimed is:

1. A method of producing a powder of fine alloy particles having an uneven surface which is a method for producing a powder of an alloy containing T and M in a composition ratio represented by the formula [$T_xM_{1-x}$], where T is one or two or more of the elements Fe, Co and Ni, M is one or two or more of the elements Pt, Pd and Ru, X represents a numerical value in the range 0.1-0.9, the method comprising the steps of:

dissolving metal salts containing the T component and the M component in a solution of polyhydric alcohol and/or a derivative thereof with a boiling point of 100° C. or greater such that no solids remain, and heating the solution in an inert gas atmosphere at a temperature of 100° C. or greater and 250° C. or less to reduce the metal salts with the polyhydric alcohol and/or derivative thereof, wherein a solution heat up rate to the temperature of 100° C. or greater and 250° C. or less is 0.5 ° C./minute or more and less than 15° C./min, thereby synthesizing a powder of alloy particles such that under TEM observation, a plurality of protruding points is observed on the surface of the particles and indentations are observed between the protruding points.

2. The method of producing a powder of fine alloy particles having an uneven surface according to claim 1, wherein the metal salts are reduced with the polyhydric alcohol and/or derivative thereof in the presence of a nucleating agent added to the solution, the nucleating agent selected from the group consisting of at least one metal salt of Au, Ag Ru, Rh, Pd, Os, Ir or Pt, wherein when the metal component in the at least one metal salt is the same as the M component, a different salt is used for the nucleating agent.

3. A method according to claim 1 further comprising supporting the fine alloy particles having the uneven surface on a carrier by dispersing the fine alloy particles in a dispersant such that there is a space of 1 nm or greater between them to form a suspension and coating the carrier with the formed suspension.

* * * * *